United States Patent [19]
Ertel et al.

[11] Patent Number: 5,149,980
[45] Date of Patent: Sep. 22, 1992

[54] SUBSTRATE ADVANCE MEASUREMENT SYSTEM USING CROSS-CORRELATION OF LIGHT SENSOR ARRAY SIGNALS

[75] Inventors: John Ertel, Portola Valley; William D. Holland, Palo Alto; Kent D. Vincent, Cupertino; Rueiming Jamp, Los Altos; Richard R. Baldwin, Saratoga, all of Calif.

[73] Assignee: Hewlett-Packard Company, Palo Alto, Calif.

[21] Appl. No.: 786,495

[22] Filed: Nov. 1, 1991

[51] Int. Cl.⁵ .............................................. G01N 21/86
[52] U.S. Cl. ....................................... 250/561; 358/105
[58] Field of Search ........................ 250/548, 557, 561; 358/105, 125; 382/42, 48; 356/28, 28.5

[56] References Cited
U.S. PATENT DOCUMENTS

| | | | |
|---|---|---|---|
| 3,890,462 | 6/1975 | Limb et al. | 358/105 |
| 3,919,560 | 11/1975 | Nopper | 250/557 |
| 3,942,022 | 3/1976 | Stumpf et al. | 358/105 |
| 4,270,143 | 5/1981 | Morris | 358/105 |
| 4,373,816 | 2/1983 | Laib | 356/375 |
| 4,683,380 | 7/1987 | Shipkowski et al. | 250/548 |
| 5,033,096 | 7/1981 | Morrison et al. | 382/48 |
| 5,062,056 | 10/1991 | Lo et al. | 358/126 |
| 5,089,712 | 2/1992 | Holland | 250/561 |

*Primary Examiner*—David C. Nelms
*Assistant Examiner*—John R. Lee

[57] ABSTRACT

Method and apparatus for determining the distance a sheet of paper, or other reflective or transmissive substrate material with a suitable, approximately planar surface, has moved in a given direction. The substrate is illuminated by reflection or transmission of light at non-normal incidence, and a linear array of N uniformly spaced light sensors is provide to receive and sense light issuing from the illuminated substrate. This produces a first or reference array of light signal strengths $s_1(k)$ ($k = 1, 2, \ldots, N$). The substrate is then moved in the given direction, and a second array of signal strengths $s_2(k)$ ($k = 1, 2, \ldots, N$) is produced. A cross-correlation function $C(K)$, formed from consecutive portions of the first and second light signal strength arrays, is then examined to determine the distance the substrate has moved in the given direction. A maximum in the cross-correlation function $C(K)$ at $K = K_0$ corresponds to displacement of the substrate in the given direction by a distance approximately equal to $(MF)(K_0 - i)d$, where $i$ is selected positive integer determined by the initial position of the substrate, the distance $d$ is determined from the known spacing of the light sensors, and MF is the system optical magnification factor. The cross-correlation function can be computed with uniform or non-uniform weights in the sum. This one-dimensional approach is extended to determining the vector of two-dimensional movement of the substrate, including translation, rotation and scaling, in a two-dimensional plane.

28 Claims, 9 Drawing Sheets

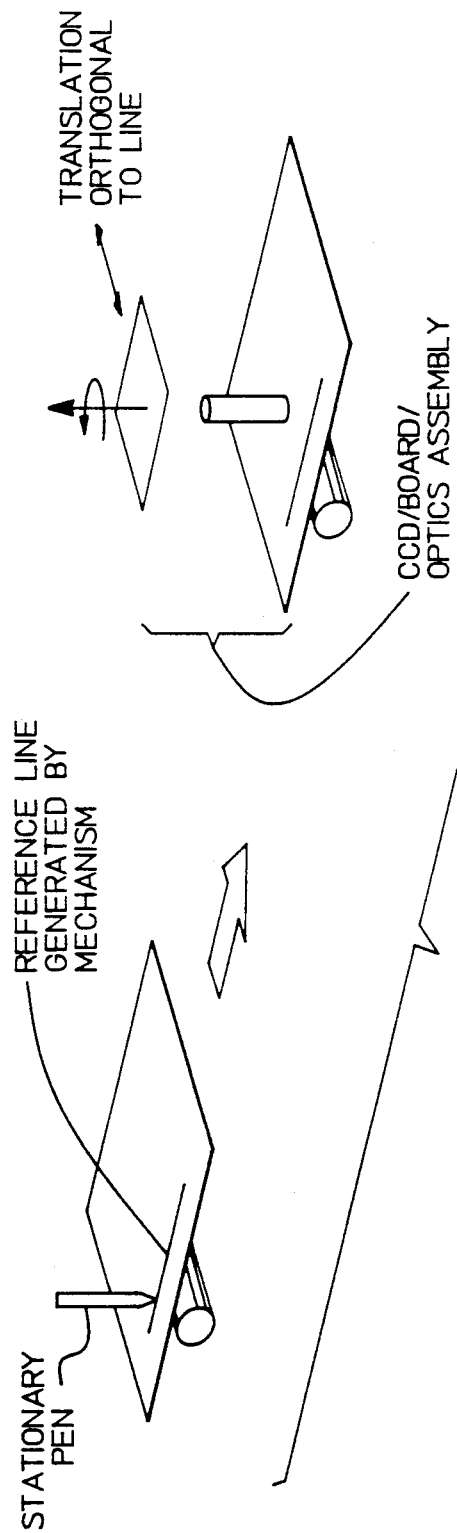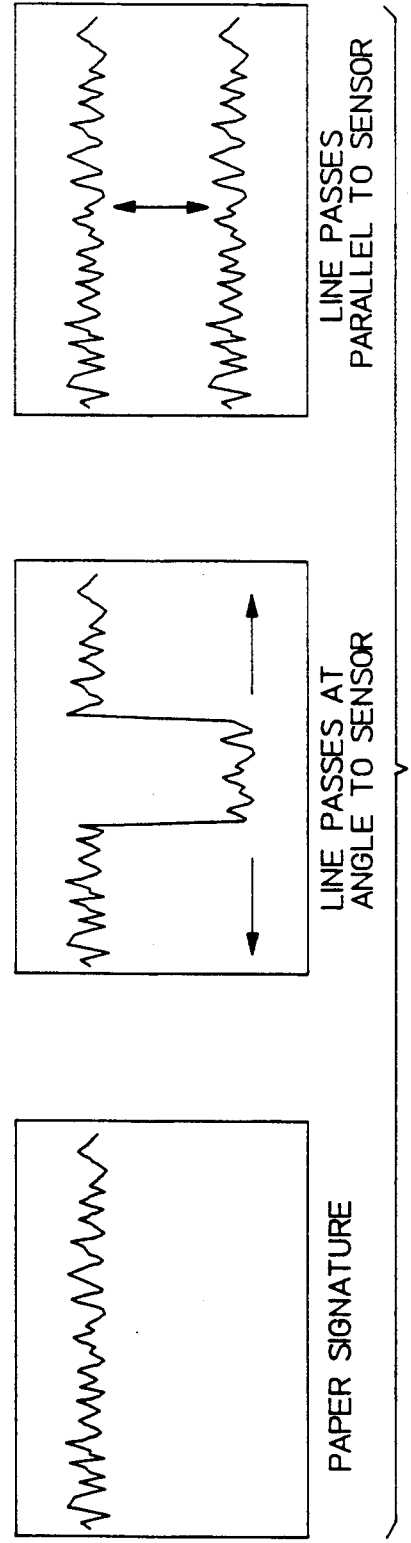
FIG 5A
FIG 5B

SUBSTRATE ADVANCE MEASUREMENT SYSTEM USING CROSS-CORRELATION OF LIGHT SENSOR ARRAY SIGNALS

FIELD OF THE INVENTION

This invention relates to precision monitoring of the position of a sheet of paper or similar material through optical measurements of differential motion of the sheet.

BACKGROUND OF THE INVENTION

Many computer peripheral devices, such as photocopiers, printers and document scanners, rely on transport of a sheet, or sequence of sheets, of paper through the peripheral device to transfer an image to, or to pick up an image from, the sheet. This sheet transport often requires precise measurement of the position of the sheet by a sensing mechanism. Measurement of position of the sheet should be performed non-invasively so that the surface and translated position of the sheet, and any image thereon, are not contacted, disturbed or altered. Precise positioning by optical means may require use of a CCD sensor or an array of such sensors, and the distance from sensor to paper surface must be known as accurately as possible to control image size or magnification and image focus. The sheet may move as much as 1000 μm in a direction perpendicular to the plane of the sheet, and the optical system associated with the sensor must compensate for this motion. Conventional optics, as illustrated in FIG. 1, provides a relatively large cone angle $2\theta$ for the light at the optical elements 11, and this angle will change the apparent image size by a substantial amount with a shift in position of the sheet 13 toward or away from the optical elements 11 or the sensor 15.

Nopper, in U.S. Pat. No. 3,919,560, discloses method and apparatus for monitoring the present position of a continuously moving web of material, using photoelectric scanning of the web for one or more of a sequence of index marks that are placed on the web margin before the web is monitored. This invasive approach, requiring placement of index marks beforehand, relies upon artificial markings and requires use of very closely spaced markings in order to assure web position accuracy good to within a few microns. Further, if the photoelectric scan means or the line of index marks move laterally relative to one another, the photoelectric means may not sense the passing of some or all of the index marks as the web moves.

In U.S. Pat. No. 4,373,816, Laib discloses use of a collimated and periodically chopped light beam that is reflected at an angle from a surface of an object, such as a piece of lumber, whose thickness is to be measured. The amount of lateral displacement of the reflected light beam determines the object thickness.

Use of a light sensor to receive light transmitted through a thin moving web of material such as fabric is disclosed in U.S. Pat. No. 4,683,380, issued to Shipkowski et al. Two adjacent photodiodes receive the transmitted light, and a perforation in the web will first manifest its presence as an abrupt difference in light received by the two diodes.

What is needed is an approach that allows determination of the distance of substrate movement in a given direction, where the approach: (1) is not sensitive to movement of the substrate in a direction that is perpendicular to the given direction; (2) is non-invasive and does not contact or alter the surface of the sheet or of any text or graphics contained on the sheet; (3) compensates for the presence of signal noise and other perturbations; (4) does not alter or affect servo response or substrate position in the given direction; (5) is flexible and allows improvements of accuracy with improvements in light measurement technology; and (6) does not require that extraneous features (reference marks, tractor feed holes, etc) be added to the substrate as an encoder strip.

SUMMARY OF THE INVENTION

These needs are met by the invention, which in one embodiment provides a linear array of N light sensors, spaced apart a uniform distance d along the array, to receive and sense light reflected from, or transmitted through, the sheet that is being moved. A first array of light strength values $s_1(k) (k=1,2,\ldots,N)$ is determined, and the sheet is then moved. A second array of light strength values $s_2(k) (k=1,2,\ldots,N)$ is then determined for the sheet, and a cross-correlation function is formed from the sum of a sequence of cross-correlation terms $s_1(k+i-1)s_2(k+K-1)$ for a selected integer K. The cross-correlation function value is then maximized by the choice of K, or of its corresponding continuum value, say $K=K_0$, and the distance D the sheet has moved in the given direction is determined to be $D \approx (MF)(K_0-i)d$, where d is the distance between two consecutive photosensor elements, including any optical magnification effects, and i is an integer representing initial position of a sensor group for monitoring a sheet "signature".

The method disclosed here is non-invasive and compensates (1) for movement of the sheet in a direction that is perpendicular to the given direction, (2) for signal noise and other undesirable perturbations, and (3) for two-dimensional motion of the sheet.

Although the method and apparatus is discussed here in terms of monitoring a sheet of paper, the invention is also applicable to non-invasive monitoring of: (1) machine tool position readouts, to determine relative position coordinates directly from an approximately planar surface of the mill stock; (2) wafer and die steppers positions for semiconductor fabrication; (3) table translation coordinates for optical devices, such as microscope objective positions; and (4) certain interferometric applications. The term "substrate" will refer here to a sheet of paper or other reflective or transmissive writing material, a piece of mill stock, a semiconductor wafer, a microscope objective or a similar light-reflective or light-transmissive medium.

BRIEF DESCRIPTION OF THE DRAWINGS

FIGS. 5a and 5b illustrates use of the invention to provide alignment of the direction of paper advance.

DESCRIPTION OF THE BEST MODE

Figure 2:
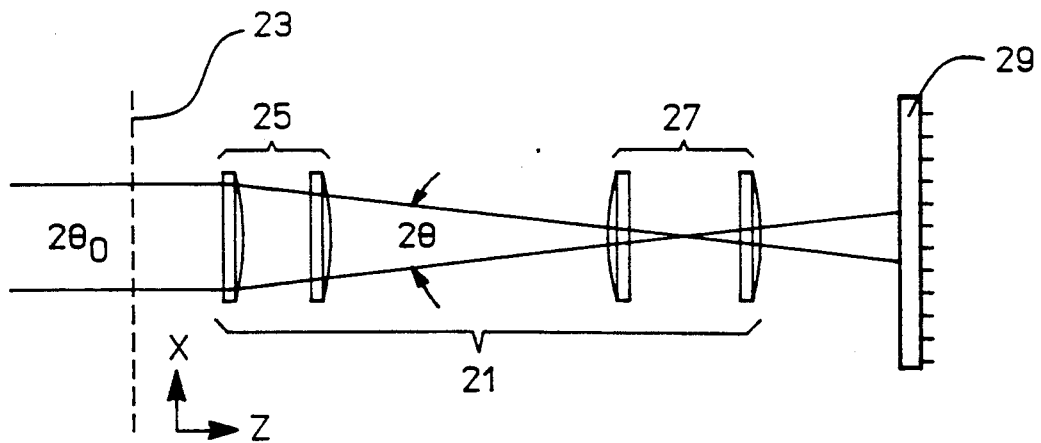
FIG. 2 is a schematic view of a preferred embodiment for sensing paper motion, illustrating paper motion perpendicular to the plane of the paper.

FIG. 2 illustrates a simplified configuration 21 of the invention for sensing motion of a substrate 23, such as a sheet of paper or other suitable material in the x-direction that is relatively insensitive to motion thereof in the z-direction. A telecentric optical system, including at least two groups of optical elements 25 and 27 that are spaced apart, forms an image of the substrate 23 at an array 29 of optical sensors. The associated cone angle $2\theta_0$ for the groups 25 and 27 of the telecentric optical system is small ($2\theta_0 << 20°$). The invention also uses an algorithm that ignores paper motion in the x-direction until the substrate 23 has moved in that x-direction by at least a minimum distance $x_{thr}$, typically 2-3 μm. Once a substrate 23 has begun to move and movement in the x-direction exceeds $x_{thr}$, motion is not considered completed until no further paper motion is sensed for at least ten consecutive sensor cycles, each of temporal length about 2 msec.

An optical sensor array 29 will typically include 256 such sensors, such as CCD sensors, arranged linearly as shown in FIG. 2. The telecentric optical system collects and directs an image or a "signature" of the substrate 23, whose motion is being monitored, onto the sensor array 29. Each sensor in the array 29 will receive a somewhat different pattern of light, where the substrate 23 is held stationary relative to the sensor array 29, and this varying sensor-by-sensor pattern is one representation of the "signature" of that portion of the particular substrate 23 of paper.

All paper, plain or ruled or having graphics thereon, has a signature for this purpose. The signature may be provided by illuminating and imaging the surface texture or other optical characteristics of the substrate 23, preferably with light whose incidence angle at the sheet is relatively large. Many other surfaces, both approximately planar and otherwise, have surface signatures that can be illuminated and imaged or sensed for purposes of position monitoring.

In order to make optimum use of the 256 elements in a standard CCD optical sensor array, 128 consecutive elements of data, referred to herein as a "reference segment", are taken from the full 256-element CCD data and stored and used as a reference. Choice of the number 128 is for convenience of discussion only and is not intended to limit the invention to that number. After the substrate has moved, the reference segment is then translated and compared to the full 256 elements of CCD data to find the best match or cross-correlation. There are 129 possible cross-correlations, and a correlation strength value is calculated for each one by electronic hardware on an operator-adjustable correlator board. If L consecutive CCD elements form the reference segment, the number of possible correlations is $257 - L$.

The correlator board is connected to the backplane of an HP 9000 series 300 or other suitable computer. An M-degree polynomial ($M \geq 2$; $M = 2$ preferred) is fitted to the correlation data in a neighborhood of the most likely sheet position for sheet translations along the 256-sensor array, and a peak signal finder is applied to the curve to determine the position or translation that produces the highest cross-correlation value. Knowing the optical magnification and spacing of the photosites, it is possible to determine the amount the substrate 23 has moved in the x-direction by observing the amount (number of sensors) that the cross-correlation peak has moved in the x-direction from the original location of the reference data. Interpolation between photosites or sites of sensor readings is permissible here so that measurement of movement by a fraction of a sensor width is possible.

The 128-element-wide reference data can be translated and compared to the newly presented 256-element-wide CCD data, depending on where the data are taken from the 256-element array. New CCD data are taken every 2 msec, but the reference data are only updated at the start of the program or at the end of a "move".

Figure 3:
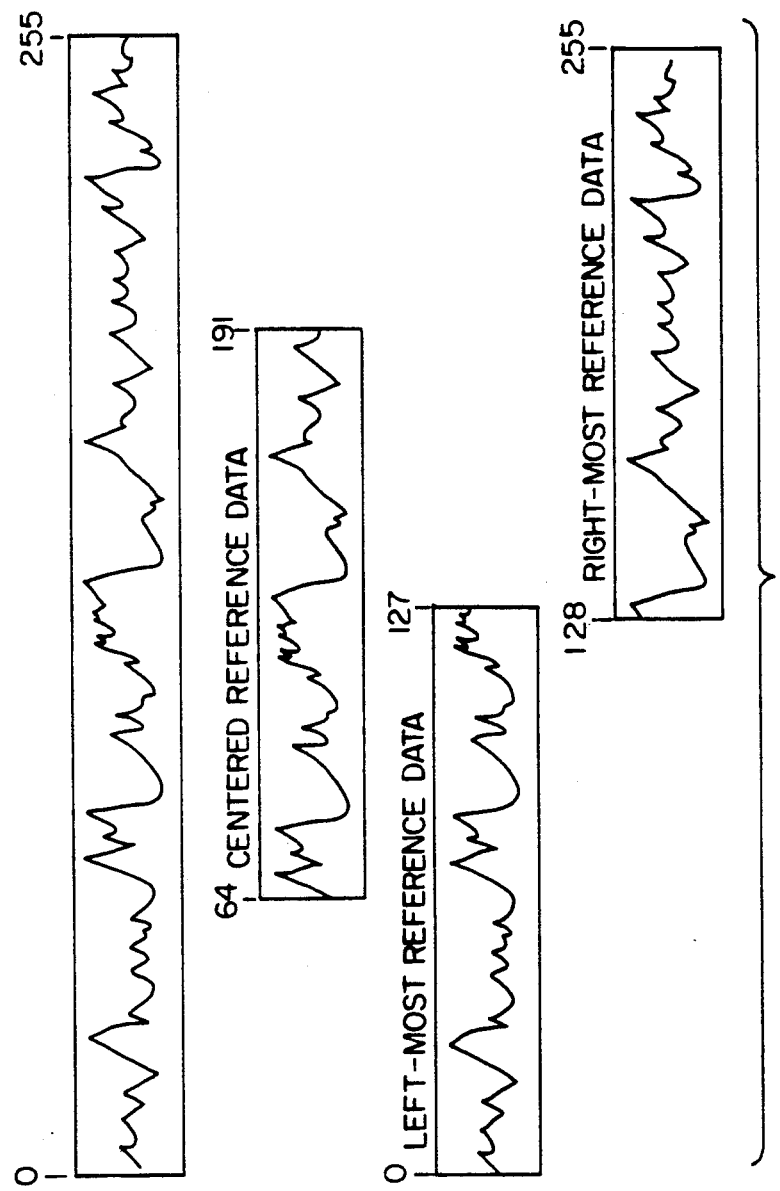
FIG. 3 illustrates the use of data from 128 consecutive elements of a CCD optical sensor array containing 256 sensors for three different tracking configurations: (a) center; (b) left-most; and (c) right-most.

Three versions of the measurement software are available: one where the reference data are taken from the center portion of the linear array of CCD sensors; one where the reference is from the 128 left-most elements; and one where the reference is from the 128 right-most elements. Use of centered reference data allows the system to sense either forward or backward motions of the substrate 23, but only half the possible range of motion at a given optical magnification is available. Because some printers or other paper movement devices only move the substrate 23 of paper in one direction, it is logical to take the reference data from one or another end, depending on orientation of the sensor, and observe a larger possible range of motion. This is illustrated in FIG. 3. However, software that is bi-directional is also available as part of the invention.

Correlation of reference segment data to CCD data is the basis of the motion-sensing ability of this system. A change in the position where peak correlation occurs is directly related to motion of the paper or other media. We have designed electronic hardware to perform this correlation for use in a closed loop positioning system, and the same design and hardware is used in this open loop measurement system. The correlation process operates essentially as follows. Each data point value from the reference data is multiplied by the corresponding point value in the translated CCD data. The values for each of these partial products are summed together to produce the correlation value for that translated or incremental position.

The CCD sensor array used here may be a Fairchild CCD111A, for example, which has 256 13-μm-square photosites (0.000512-inch square), or a similar CCD device. Use of a four-power optical magnification allows the CCD to sense a section of paper 0.524094-inch wide. The maximum possible advance increment is half that value, or 0.262047-inch, if only left or right tracking is used, and half again as much, or 0.131024-inch, if centered reference data are used. In practice, it is advisable to assume a smaller maximum paper advance size than is theoretically possible, such as approximately 80 percent of the maximum values listed above. This is because in a servo system, some overshoot often occurs before the system settles to the final position. If the reference data are not completely contained in the CCD data available in the sensors, it is impossible to calculate meaningful cross-correlation values due to incomplete overlap, and the curve representing the cross-correlation data becomes very distorted. The peak signal finder routine does not work and the system becomes "lost" until it is reset or re-started. Some printers have an ideal swath advance of 0.1667 inches. This swath advance value is easily accommodated by this system if a left or right justified reference is taken, whichever is suitable. Printers with larger or smaller swath advances than this would make optimum use of the CCD array by adjusting the optical magnification accordingly.

In most cases, ambient room lighting does not provide sufficient signal strength at the sensor's CCD. Larger area detectors would collect more light, but dark current increases with the square of detector area, and the signal-to-noise ratio could be poor. Added light is required and is available from a large number of possible light sources. Experience has shown that possible light sources include light-emitting diodes (individual or arrays), ac and dc incandescent lamps (microscope lights, pocket flashlights, automotive car dome lights), and fluorescent lamps. However, fluorescent lamps only work with ac power, and because the light decays so quickly between adjacent ac cycles, this frequency is seen as a flicker in the CCD data. The operating frequency must be high enough that a number of light cycles occur for every CCD cycle. We have designed a 40 KHz power supply that allows use of a small fluorescent light source with the CCD system. The paper signature from which the light sensor data are constructed may be provided by reflection of the light from the surface of the sheet, or by transmission of light through the sheet (assumed to be at least partially transparent here).

The amount of light added to ambient should result in a CCD output signature between 0.5 and 1 Volt dc. The CCD sensor array used here has a saturation output voltage of 1 Volt. The absolute value of the light intensity needed at the source depends on the distance of the source from the sheet, on the angle of incidence and the reflectivity of the particular paper, and on the f number of the optics used. At close to normal incidence, light reflection is highest, but tends to "wash out" the surface texture of the paper. Viewed at grazing incidence, light reflection perpendicular to the plane of the paper is minimal, but the exaggerated shadowing of the surface texture produces a very distinctive paper signature, due to high contrast between the illuminated and shadowed portions of the paper fiber. A compromise between these two extremes is necessary for practical application, and includes consideration of the proximity of the lens barrel to the paper (approximately 0.5 inch in one embodiment) and any other light path obstruction.

Figure 4:
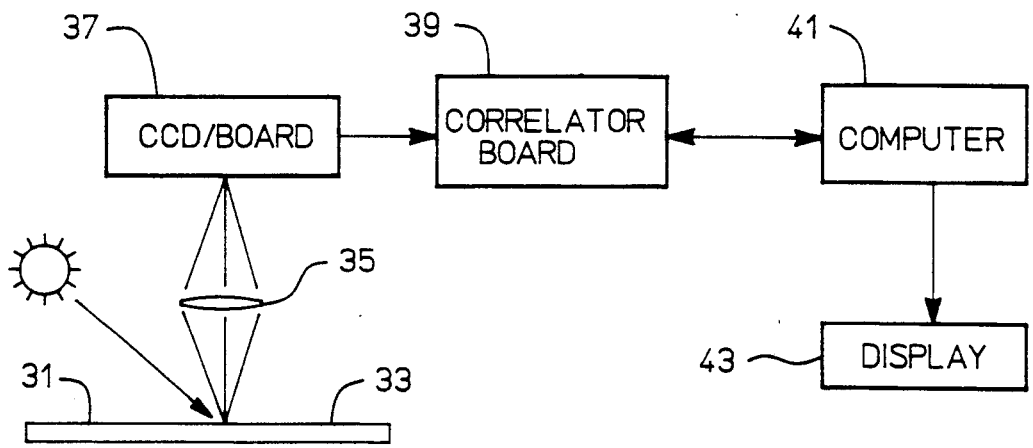
FIG. 4 is a block diagram of the system used to practive the invention.

A block diagram of the measurement system is shown in FIG. 4. Because the CCD photosites are arranged in a 256×1 linear array, this array must be oriented in-line with the direction of the paper advance in order to correctly measure its motion. Misalignment by an angle $\phi$ result in errors proportional to $(1-\cos\phi)$ in the measurement. The observed motion would be the cosine of the misalignment angle times the actual distance moved by the substrate 23. If the system is misaligned by a large amount, the signature of the paper in reference will move out of the field of view of the CCD when the paper is advanced, and no meaningful cross-correlation will be possible.

Fortunately, it is very easy to align the CCD to the paper advance direction. The most direct method is to cause the mechanism under test to move the paper with a stationary pen in contact with the paper. The line created by the pen should be in the area where the sensor is positioned, usually close to an edge. With paper advance stopped and the sensor positioned over the line, the sensor is moved orthogonally with respect to the line, so that the pen line comes into and out of the field of view of the sensor. Using an oscilloscope, the pen line is sensed by the sensor as a transition to a lower signal strength portion, due to reduced light reflection of the paper signature. If the line of the sensor crosses the pen line at an angle, this crossing will be seen as a distinct dip in the paper signature waveform that moves from one end of the waveform to the other end as the sensor moves across the line. If the sensor crosses the line parallel to it, the entire waveform will be seen to dip and rise again, all at the same time. Thus, if the sensor is seen to be oriented at a non-zero angle relative to the line, it should be rotated about the z axis until it appears parallel to the line. Provision of a rotation and translation stage is useful to perform smooth, small motions on the desired axis, as illustrated in FIG. 5.

Figure 6:
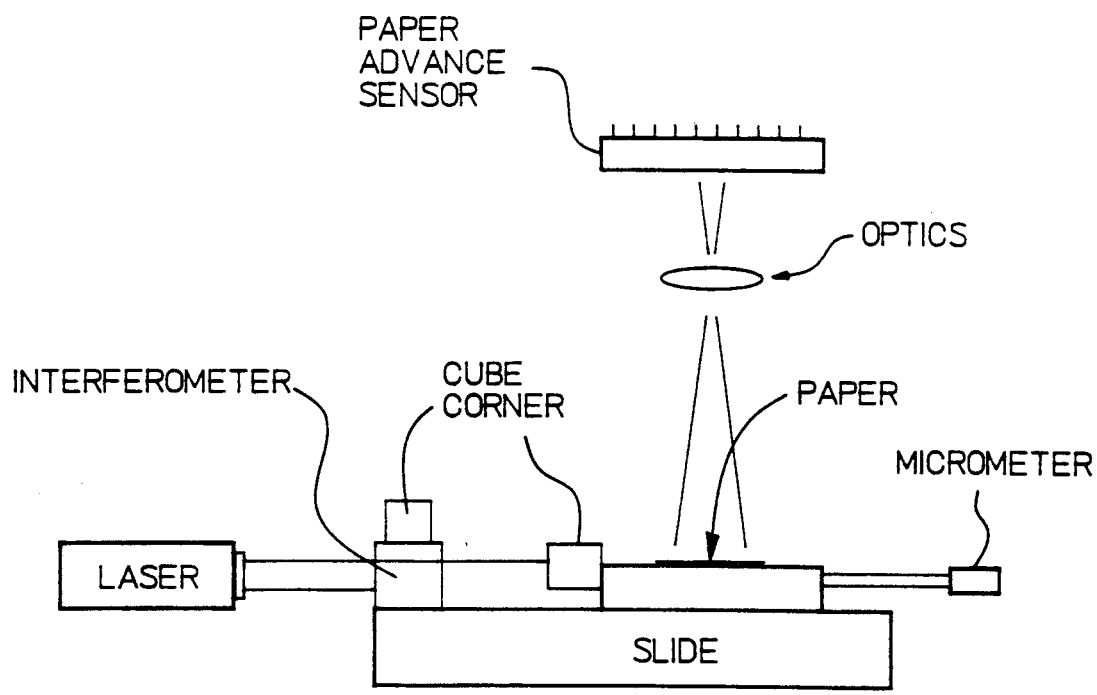
FIG. 6 illustrates use of the invention to determine actual optical magnification in monitoring paper advance.

In addition to being aligned, a given system must be calibrated with respect to optical magnification. Magnification provides a scale factor in determining the distance that the sheet 31 of paper (FIG. 4) has moved from the change in image position of the CCD. Although the magnification is stable with respect to changes in distance to the paper, the exact value is very difficult to predict due to fabrication and assembly tolerances. It is compensated by software with an appropriate magnification factor. This is illustrated in FIG. 6.

Software that applies a discrete Fourier transform to the CCD data has been developed. This is very useful for checking the magnification scale factor of the paper advance system, using a "Ronchi Ruling". A Ronchi Ruling consists of evenly spaced lines deposited or etched on a stable substrate, such as glass, and is inexpensive and available at several different line-per-inch spacings. Used with a calibrated measurement system, a Ronchi Ruling in the field of view appears as a sine wave in the CCD data. If a discrete Fourier transform is applied to these data, the transform yields the fundamental frequency of the sine wave and, using the magnification factors, calculates the spacing in lines-per-inch.

An inexpensive Ronchi Ruling is stable, but its spacing in lines-per-inch is not assured to very high accuracy. However, if the Ronchi Ruling is measured by a paper advance measurement system that has been calibrated by a laser interferometer, the reported spacing is given to high accuracy. Thereafter, that Ronchi Ruling may be used as a secondary magnification checking standard. This is useful to verify that nothing has changed with the passage of time in the paper advance measurement system that would affect the magnification factor.

After the system has been calibrated and aligned, position of the sheet of paper is determined as follows. Let the original light strength values sensed by the light sensors form a first array $s_1(k)$ ($k=1,2,\ldots,N$) of values, and let the light strength values sensed by the light sensors after translation of the substrate 23 in FIG. 2 form a second array $s_2(k)$ of values. If the reference array of sensor values is L values wide, the cross-correlation value $$C(K) = \sum_{k=1}^{L} s_1(k + i - 1) s_2(k + K - 1) \qquad (1)$$

$$(K = 1, 2, \ldots, N - L + 1; L \leq N - 1)$$

is formed, and the maximum value of $C(K)$, say at $K = K_0$, is used to determine the most likely distance D of translation of the substrate 23. Here, it is assumed that the signature of the sheet that is monitored extends from the position of sensor no. i to the position of sensor no. $i+L-1$. If adjacent light sensors are spaced apart a distance d, not including compensation for optical system magnification, the most likely distance of translation D is $(K_0-i)d$. If magnification is compensated for, the number $(K_0-i)d$ would be divided by the optical system magnification factor MF. In the embodiment discussed above, $N=256$ and $L=128$. If the paper may move or advance in either direction, the integer K used in Eq. (1) above may vary over a set of negative and positive integers, but the size L of the reference segment would remain the same.

Figure 8:
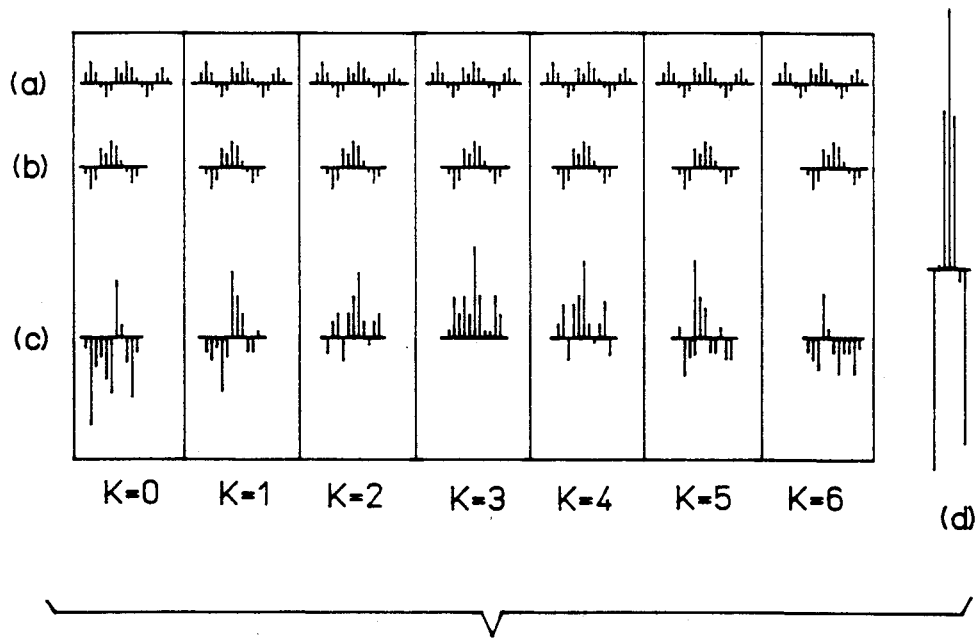
FIG. 8 illustrates determination of cross correlation of light strength values according to the invention.

In the illustration shown in FIG. 8, 11 elements of reference data (a) and 17 elements of new CCD data (b) are present. There are $(17-11)+1=7$ possible correlation points for this illustration. The partial products for the correlation values (c) for each point are summed together to produce the correlation values shown in (d).

Figure 7:
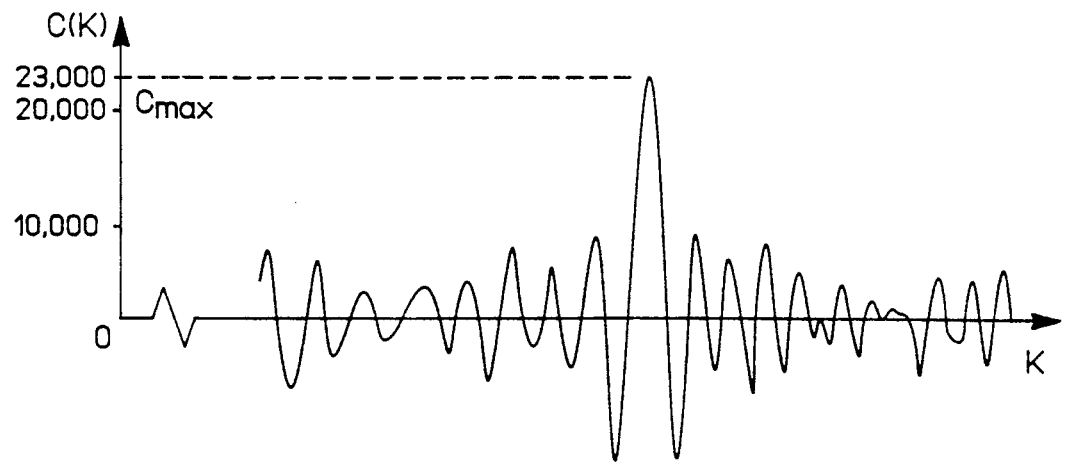
FIG. 7 illustrates the cross-correlation of paper signature data and stored CCD sensor data as the CCD sensor data are translated, according to the invention.

$M+1$ consecutive correlation values $C(K)$ in a neighborhood of the maximum correlation value are fitted with an M degree polynomial fit ($M \geq 2$) that passes through these $M+1$ values, to provide a continuous correlation curve. The position of the maximum correlation value or correlation peak is found by interpolation of the polynomial curve so that resolution is substantially finer than the spacing of consecutive photosensor sites. This is illustrated schematically in FIG. 7.

The absolute magnitude of the correlation peak is not as important as peak sharpness, which distinguishes a background peak from the correlation peak, defined as $$C_p = \sum_{k=1}^{L} s_1(k + i - 1)^2 \; (1 \leq i \leq N) \qquad (2)$$

The peak has a magnitude of 23,000 units in this example, and it can be seen that nearby background peaks have absolute magnitudes of approximately 7,000–10,000 units. We have found that for any given print media, lighting conditions, etc., once a correlation peak strength $C_p$ is determined, a minimum threshold for subsequent peaks $C(K)_{max}$ in Eq. (1) should be established at approximately one half the initial peak magnitude. The threshold $f=0.5$ for the ratio $C(K)_{max}/C_p$ of subsequent peak to initial correlation peak can be replaced by another suitable ratio f with $0<f<1$. Because this system will always report the location of the "best" correlation match, use of a minimum threshold provides a criteria to ensure that the measurement is a valid one. Factors that might cause invalid measurements include skew, translation other than in-line with the sensor array, changes in position in one or more optical elements and changes in light intensity. Software has been updated to record the correlation magnitude at the beginning of a measurement cycle, and to flag any incremental measurement where the correlation magnitude is below the minimum threshold. Software also flags instances where the measurement system senses the start of a move cycle, but the final position is the same as the start position. This cancels "noise" and/or vibration-induced "false" moves.

Use of a reference array of L consecutive sensor values for computing the cross-correlation $C(K)$ in Eq. (1) is equivalent to use of a weighted array of the form $$C(K) = \sum_{k=1}^{L} w_k s_1(k + i - 1) s_2(k + K - 1), \qquad (3)$$

in which the non-zero weights $w_k$ are all equal. This is illustrated in FIG. 9 in curve (a), which represents a rectangular function that is reproduced by the choice $$w_k = 1 (k = k_1, k_1 + 1, \ldots, L + k_1 - 1) \qquad (4)$$
$$= 0 (\text{otherwise}).$$

Figure 9:
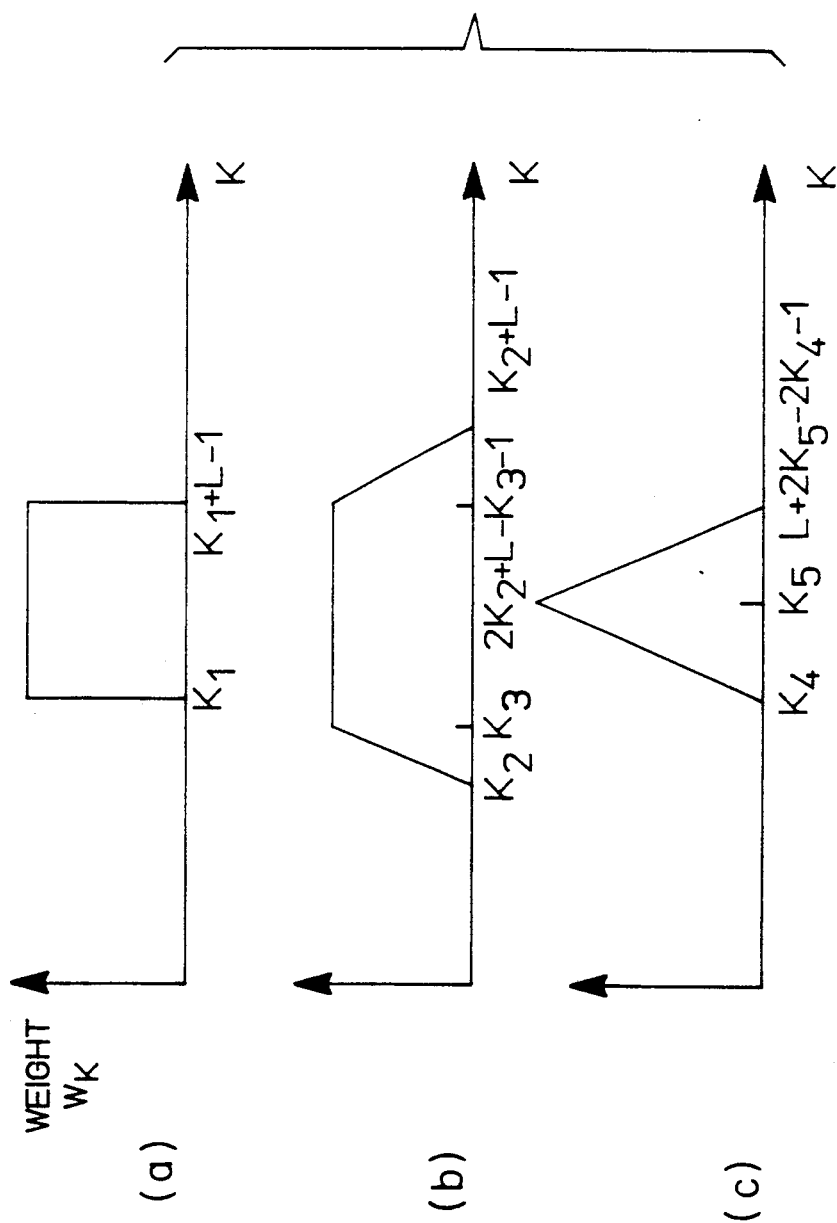
FIG. 9 illustrates three suitable choices for functions representing weights $w_k$ to be used in formation of certain cross-correlation values according to the invention.

Another alternative is to choose the weights $w_k$ to represent a trapezoidal function, as illustrated by curve (b) in FIG. 9, with the choice $$w_k = c_1(k - k_2)(k = k_2, k_2 + 1, \ldots k_3) \qquad (5)$$
$$= c_1(k_3 - k_2)(k = k_3 + 1, \ldots, L + 2k_2 - k_3 - 1)$$
$$= c_1(k - L - k_3 + 1)(k = L + 2k_2 - k_3, \ldots, L + k_2 - 1)$$
$$= 0 (\text{otherwise}).$$

where $c_1$ is a positive constant and $k_2$ and $k_3$ are integer indices satisfying $0<k_2<k_3<L/2$. A third alternative is to choose the weights $w_k$ to represent a triangular function, as illustrated in curve (c) in FIG. 9, with the choice $$w_k = c_2 k (k = k_4, k_4 + 1, \ldots, k_5) \qquad (6)$$
$$= c_2(L + 2k_5 - 2k_4 - 1 - k)$$
$$(k = k_5 + 1, \ldots, L + 2k_5 - 2k_4 - 1)$$
$$= 0 (\text{otherwise}),$$

where $c_2$ is a positive constant and $k_4$ and $k_5$ are integer indices satisfying $0<k_4<k_5$. The rectangular, trapezoidal and triangular functions represented by the weights $w_k$ in Eqs. (4), (5) and (6) need not be symmetric. More generally, the weights $w_k$ in Eq. (3) may be chosen to represent any function that is non-negative, is positive in a selected interval, is monotonically increasing in the index k up to a maximum weight value within this interval, is monotonically decreasing to zero in the index k as soon as the weight $w_k$ falls below the maximum value, and is zero outside the selected interval. Such a function is referred to herein as a Doubly Monotone weight function. Any Doubly Monotone weight function will assign less weight to products $s_1(k) s_2(k+K)$ near the edge of the reference segment than to the corresponding products near the center of the reference segment.

The cross-correlation functions $C(K)$ and $C_p$ appearing in Eqs. (1), (2) and (3) may be replaced by more general power law cross-correlation functions such as $$C_{\mu 1, \mu 2}(K) = \Sigma [s_1(k+i-1)]^{\mu 1} [s_2(k+K-1)]^{\mu 2}. \qquad (7)$$

where $\mu_1$ and $\mu_2$ are predetermined positive numbers, and the signal processing to determine the incremental change of position follows as before. For example, the numbers $\mu_1$ and $\mu_2$ could satisfy the normalization relation $\mu_1+\mu_2=1$ (or $=2$). As a further generalization, the conventional cross-correlation function or the power law cross-correlation function may be replaced by a power law difference function, difined by $$D_{\mu 3}(K) = \Sigma |s_1(k+i) - s_2(k+K-1)|^{\mu 3}, \tag{8}$$

where $\mu_3$ is another predetermined positive number, for example, $\mu_3 = 1$ or 2. The conventional cross-correlation function, the power law cross-correlation function, and the power law difference function are all particular examples of a search for a pattern match and these are referred to here as a "Generalized Pattern Match".

Figure 10:
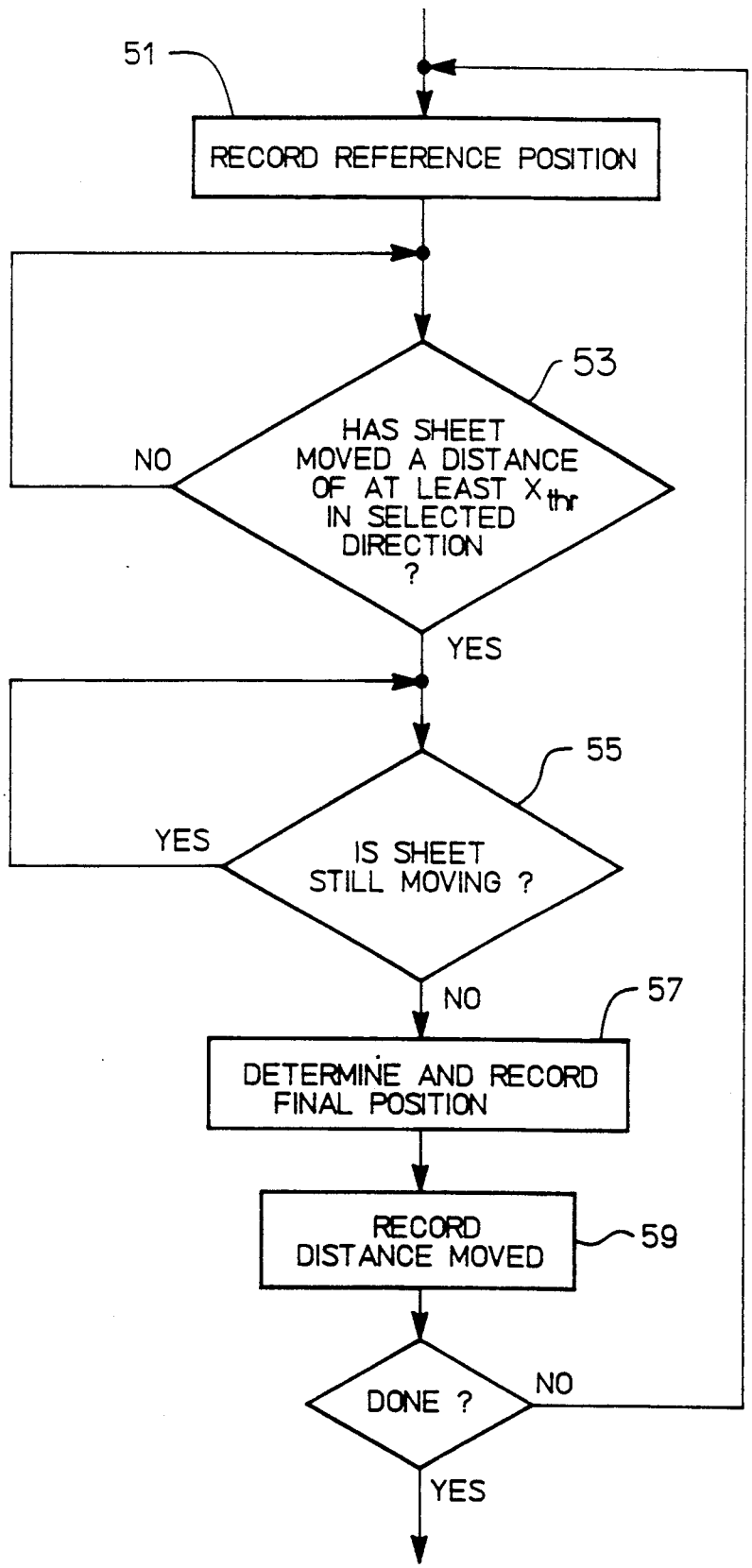
FIG. 10 illustrates, in flow chart form, an embodiment of the method according to the invention.

FIG. 10 is a flow chart illustrating the general steps of one embodiment of the method. In step 51, the system records a reference position of the sheet. In step 53 (optional), the system determines whether the sheet has subsequently moved at least a threshold distance $x_{thr}$ in the selected direction. If not, the system assumes the sheet is stationary. If the sheet has moved at least the threshold distance $x_{thr}$, the present position of the sheet may also be determined and recorded in step 53. If the sheet is still moving, as determined in step 55, the system recycles until the sheet appears to come to rest for at least a minimum time interval of a predetermined length, such as 20 $\mu$sec. When the sheet appears to have come to rest, its new rest position is determined and recorded in step 57, using the method disclosed here. Finally, the distance moved by the sheet is recorded and reported in step 59 (optional). The systems then recycles.

The technique discussed here may be extended to prediction of position of the sheet at a selected time $\Delta t$ in the future, where the sheet is moving at a determinable rate. If the present position, present velocity and present acceleration, measured in the selected direction, are $x_0$, $v_0$ and $a_0$, respectively, at a time $t_0$, the position of the sheet at a time $t = t_0 + \Delta t(\Delta t > 0)$ is predicted to be $x(t_0 + \Delta t) = x_0 + v_0(\Delta t) + a_0(\Delta t)^2/2$. Using this position prediction, the window that is associated with L consecutive optical photosites can be translated and centered at the most likely position for the sheet at a selected future time $t = t_0 + \Delta t$.

The invention disclosed here may also be extended to determination of position in two perpendicular directions, denoted x and y for convenience here, in a plane. Consider a sheet 71 (FIG. 11), lying in a plane P, that is translated by an amount $\Delta s$ in a selected direction denoted by the two-dimensional vector $R = (\Delta x, \Delta y)$ lying in the plane P, then rotated by an angle $\Omega$ about a center of rotation in the plane P, and then scaled in two dimensions by the respective scale factors f1 and f2. These three motions, considered together, may be represented as a matrix transformation on a point $(x,y)$ lying in the plane P, viz.

$$\begin{bmatrix} x' \\ y' \end{bmatrix} = \begin{bmatrix} f1\cos\Omega & f1\sin\Omega \\ -f2\sin\Omega & f2\cos\Omega \end{bmatrix} \begin{bmatrix} (x + \Delta x) \\ (y + \Delta y) \end{bmatrix} = \tag{9}$$

-continued
$$\begin{bmatrix} f1(x + \Delta x)\cos\Omega + f1(y + \Delta y)\sin\Omega \\ -f2(x + \Delta x)\sin\Omega + f2(y + \Delta y)\cos\Omega \end{bmatrix}$$

Figure 12:
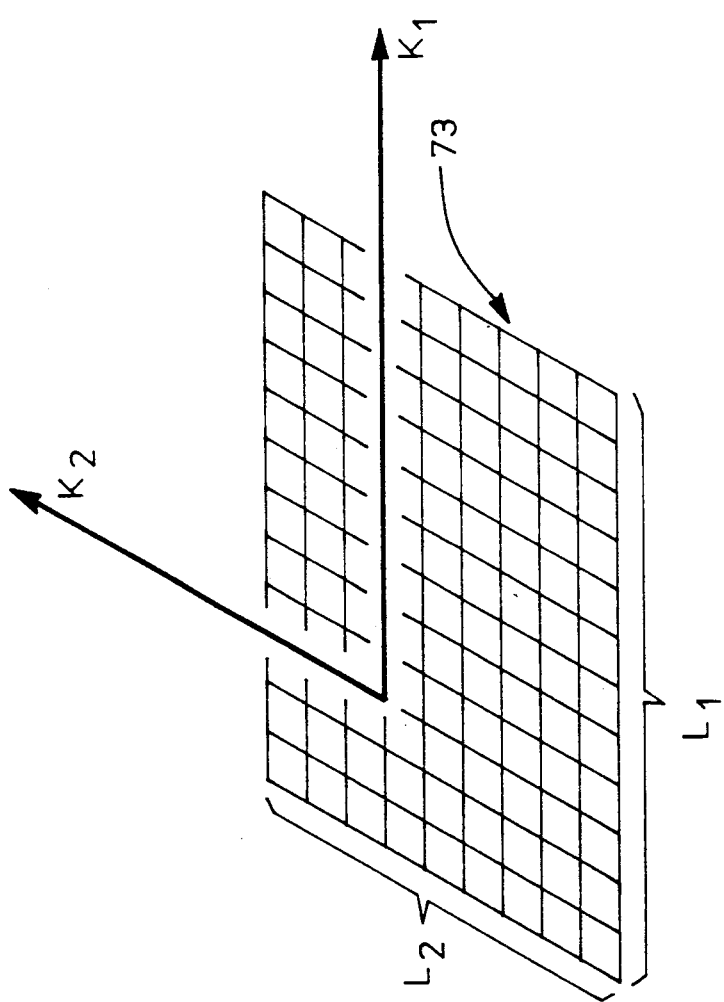

Here, a two-dimensional array of optical sensors is provided adjacent to the sheet 71 in order to sense a signature of a selected region on the sheet surface after two-dimensional movement of the sheet 71, as illustrated in FIG. 12. A two-dimensional cross-correlation window W for the optical sensor images is now formed, defined by an $L_1$ by $L_2$ rectangular sub-array 73 of sensors, from the larger $N_1$ by $N_2$ two-dimensional array of sensors. This two-variable, two-dimensional cross-correlation function $C_2(k_1,k_2)$ is defined by the relation $$C_2(K_1, K_2) = \sum_{k_1=1}^{L_1} \sum_{k_2=1}^{L_2} s_1(k_1 + i_1 - 1, k_2 + i_2 - 1) \tag{10}$$

$$s_2(k_1 + K_1 - 1, k_2 + K_2 - 1).$$

and the correlation function $C_2(K_1,K_2)$ is maximized with respect to a choice of the two translation vector components $K_1$ and $K_2$. Here, a two-dimensional signature of the sheet is assumed to extend over the ranges $i_1 \leq k_1 \leq i_1+L_1-1$ and $i_2 \leq k_2 \leq i_2+L_2-1$. Application of the two translation vector components $K_1$ and $K_2$ is assumed to translate the window W of the sheet 71 to approximately the center of the selected region. A second three-variable, two-dimensional cross-correlation function $$C_3(\Omega',f1,f2) = C_2(f1K_1\cos\Omega' + f1K_2\sin\Omega', -f2K_1\sin\Omega' + f2K_2\cos\Omega'), \tag{11}$$

dependent upon rotation angle $\Omega'$ and scale factors f1 and f2, is then introduced and used to describe re-orientation of the sheet 71 by a rotation of the sheet signature by an angle $\Omega'$ and scaling by factors f1 and f2 in the plane P, about a center of rotation lying within the region that results from translation of the selected region by the translation vector $(K_1, K_2)$. The two continuous variables $f1K_1\cos\Omega' + f1K_2\sin\Omega'$ and $-f2K_1\sin\Omega' + f2K_2\cos\Omega'$ will not generally coincide with one of the lattice of discrete coordinates $(k_1,k_2)$ for which the light strength signals $s_1(k_1,k_2)$ and $s_2(k_1,k_2)$ are defined. If, as here assumed, the sampling frequency of the light strength signals $s_1(k_1,k_2)$ and $s_2(k_1,k_2)$ equals or exceeds the well known Nyquist sampling frequency, the values of the light strength signals $s_1(x_1,x_2)$ and $s_2(x_1,x_2)$ for any values $x_1$ and $x_2$ in the intervals $0 \leq x_1 \leq N_1 d_1$ and $0 \leq x_2 \leq N_2 d_2$ can be reconstructed without aliasing from the sampled values. This extension of the light strength signals $s_1(k_1,k_2)$ and $s_2(k_1,k_2)$ from a discrete lattice of coordinates $(k_1,k_2)$ to a two-fold continuum is assumed to be done here for Eqs. (11) and (12).

Figure 11:
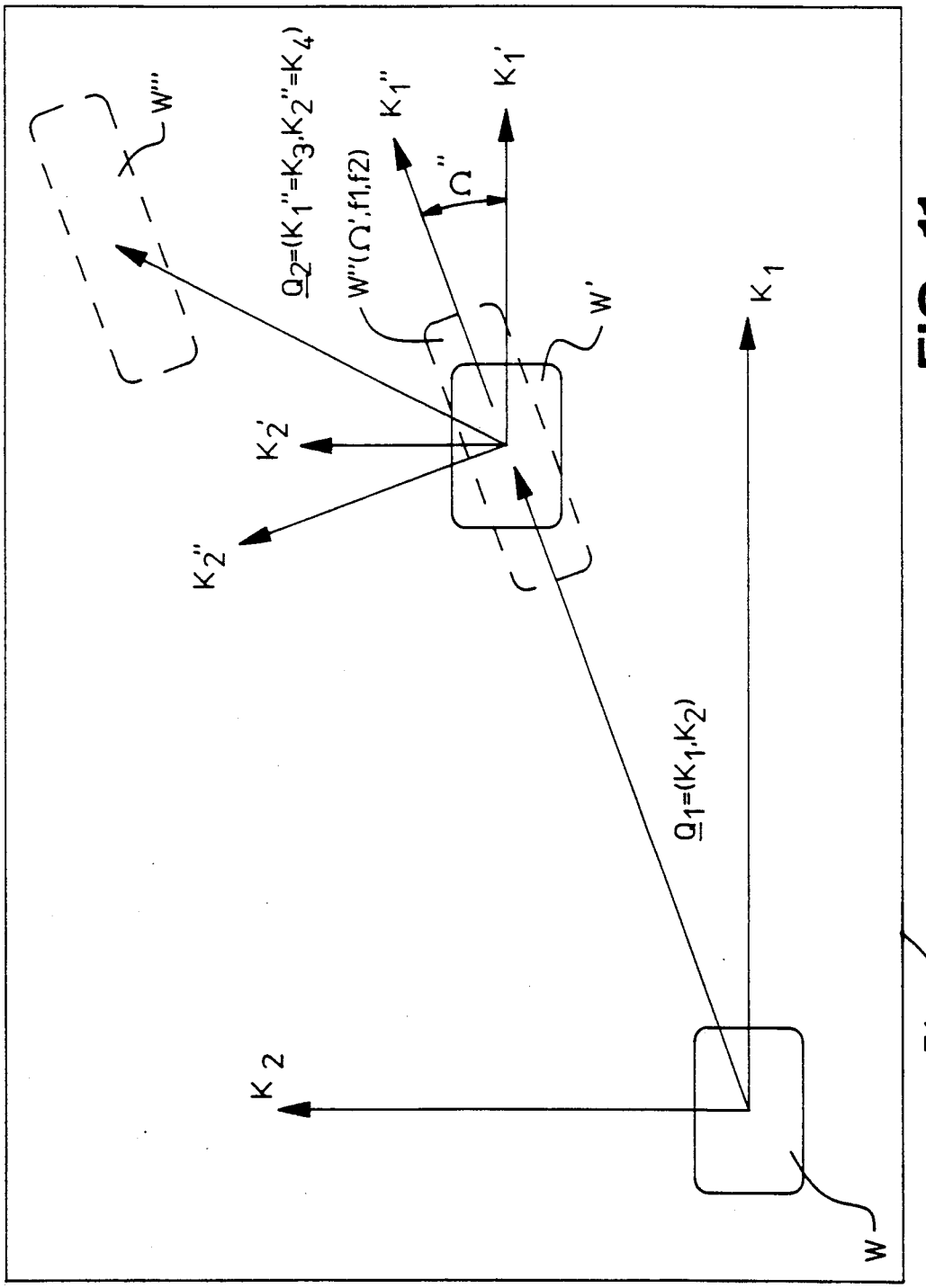
FIGS. 11 and 12 illustrate application of one embodiment of the invention to two-dimensional motion of a sheet.

In Eq. (11), the parameters $K_1$ and $K_2$ are regarded as fixed by the preceding translation operation. The cross-correlation function $C_3(\Omega',f1,f2)$ is then maximized with respect to choice of the rotation angle $\Omega'$ and scaling factors f1 and f2. The signature of the sheet 71 is then assumed to have moved by the combination of a translation by the vector $(K_1,K_2)$ plus a rotation about the rotation center by an angle $\Omega'$, plus scaling by the factors f1 and f2, executed in that order, as illustrated in FIG. 11. This combination will not necessarily produce an exact sensor-by-sensor fit of the sheet signature associated with the window W or with the window W'; and it may be preferable to include a second translation with associated translation vector $(K_3,K_4)$ and to maximize another two-variable, two-dimensional cross-correlation function $$C_2(K_3,K_4)' = C_2(f1K_1 \cos \Omega' + f1K_2 \sin \Omega' + K_3,$$

$$-f2K_1 \sin \Omega' + f2K_2 \cos \Omega' + K_4). \quad (12)$$

where the parameters $K_1, K_2, \Omega', f1$ and $f2$ are regarded as fixed by the preceding translation, rotation and scaling operations. The original window W has moved to the position W', then moved to the position $W''(\Omega',f1,f2)$, and then moved to the position W'''. This two-dimensional embodiment discussed above will require use of an $N_1$ by $N_2$ array of photosensors, use of an $L_1$ by $L_2$ window sub-array 73 of photosensors, and sequential maximization of two or three cross-correlation functions, $C_2, C_3$ and $C_2'$, each having two or three variables with respect to which maximization is performed. The computational complexity of the two-dimensional extension is daunting, compared to the computational complexity of the one-dimensional approach discussed above.

With reference to determination of the optical magnification of the measurement system, the Ronchi Ruling technique described earlier is not used in the preferred embodiment of the invention. All four lenses in the telecentric optical system are mechanically fixed with respect to each other. Focus adjustments move the set of four lenses as a whole with respect to the CCD sensor. This has a small but appreciable effect on image size and magnification. We have found that the system can be locked at a given focus and corresponding magnification, using a lock-ring on the lens barrel. Once fixed, the magnification factor MF can be determined to high accuracy, using a laser/air bearing system or other suitable magnification determination system. Telecentric optics do not change image size with changes in object distance, and this system has sufficient depth of field so that focus is also maintained over the designed distance ±1.0 mm. Our experience has shown that, once the system is calibrated in this way, it is quite rugged and measurements are repeatable when re-tested against the laser/air bearing system. Additional benefits are that (1) users need not adjust focus, and need not determine magnification and (2) the system is less susceptible to vibration problems.

With reference to the alignment procedure described above, all systems to date have been manually aligned with very good success. Possibly some applications, such as production line quality assurance of line feed accuracies, might warrant use of automatic alignment as part of a "turn-key" test system. Such automation could be achieved using robotics techniques which follow the same algorithm/procedure described for the manual alignment.

Figure 1:
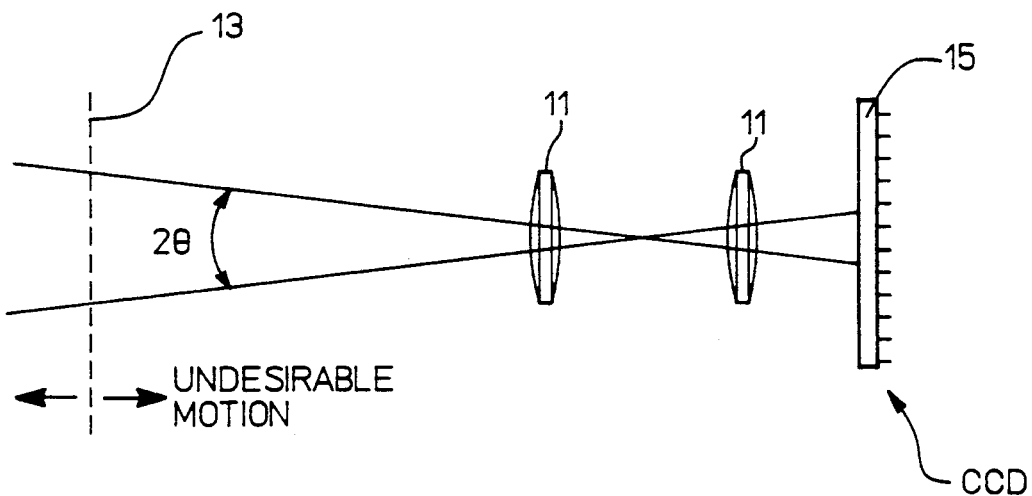
FIG. 1 is a schematic view of a prior art configuration for sensing paper motion, illustrating an effect of paper motion perpendicular to the plane of the paper.

Although the invention has been described using reflected light to provide the signature of the sheet or substrate 23 in FIG. 1, other embodiments of the invention make use of light that is transmitted through the substrate. Where transmitted light is used to form the signature, the substrate 23 must be at least partially transparent to the light, but the sheet as illuminated by transmitted light must manifest some local variation in transmission so that a sheet signature can be recognized by the system. The light transmitted through, or reflected from, the substrate 23, which is referred to herein as "issuing from" the substrate, need not lie in the visible range. Any wavelength range may be used as long as the photosensors are reasonably sensitive in that range.

We claim:

1. A method for determining the distance of advance in a selected direction of a sheet of paper or other substrate, the method comprising the steps of:

illuminating a selected surface of the substrate with light of at least a predetermined light strength signal at a predetermined angle;

providing N light sensors, positioned in a linear array and uniformly spaced apart by a distance d along the linear array, that each receive and sense the signal strength of light issuing from the selected surface at a predetermined optical magnification factor MF and provide a first array of light strength signals $s_1(k)$ (k=1, 2, ..., N), where N is a selected integer $>2$;

allowing the substrate to move in the selected direction;

allowing the array of sensors to each receive and sense a second array of light strength signals $s_2(k)$ (k=1, 2, ..., N), for light issuing from the selected surface, after the substrate has moved;

forming the cross-correlation function $$C(K) = \sum_{k=1}^{L} s_1(k+i-1)s_2(k+K-1)$$

$$(K = 1, \ldots, N - L + 1)$$

of the first and second arrays of light strength signals, where L is a predetermined integer satisfying $1 \leq L < N$ and i is a selected integer satisfying $1 \leq i \leq N$, and determining the value of the interger $K = K_O$ that produces the largest value of the cross-correlation function value $C(K)$; and determining that the substrate has moved an approximate distance $D = (MF)(K_O - i)d$ in the selected direction.

2. The method of claim 1, further comprising the step of treating motion of said substrate in said selected direction as absent unless said substrate has moved at least a distance $\mu d$ in said selected direction, where $\mu$ is a selected positive threshold constant.

3. The method of claim 1, further comprising the steps of:

forming a peak correlation value $C_p$ defined by $$C_p = \sum_{k=1}^{L} s_1(k+i-1)^2$$

from said first array of light strengths;

comparing the peak value $C_p$ with the maximum cross-correlation value $C(K_O)$ found from said cross-correlation values $C(K)$; and indicating that an error may be present if $C(K_O)/C_p < f$, where f is a predetermined positive number satisfying $0 < f < 1$.

4. The method of claim 1, further comprising the steps of:

determining the position $x_O$, velocity $v_O$ and acceleration $a_O$ of a selected point Q on said substrate at a selected time $t = t_O$;

predicting the position of said point Q at a selected time $t = t_O + \Delta t > t_O$ by means of the relation $x_Q(t = t_O + \Delta t) = x_O + v_O \Delta t + a_O (\Delta t)^2 / 2$; and choosing the center Q' of the second array of light sensor positions corresponding to said second array of light strengths so that the center Q' approximately coincides with the position $x_Q(t=t_O+\Delta t)$ at the selected time $t=t_O+\Delta t$.

5. The method of claim 1, wherein said step of illuminating said substrate comprises illuminating said substrate with a light beam that is focused by a telecentric optical system.

6. The method of claim 1, wherein said step of illuminating said substrate with said light comprises causing said light to be reflected from said substrate selected surface.

7. The method of claim 1, wherein said step of illuminating said substrate with said light comprises causing said light to be transmitted through said substrate.

8. A method for determining the distance of advance in a selected direction of a sheet of paper or other substrate, the method comprising the steps of:

illuminating a selected surface of the substrate with light of at least a predetermined light strength signal at a predetermined angle;

providing N light sensors, positioned in a linear array and uniformly spaced apart by a distance d along the linear array, that each receive and sense the signal strength of light issuing from the selected surface at a predetermined optical magnification factor MF and provide a first array of light strength signals $s_1(k)$ ($k=1, 2, \ldots, N$), where N is a selected integer $>2$;

allowing the substrate to move in the selected direction;

allowing the array of sensors to each receive and sense a second array of light strength signals $s_2(k)$ ($k=1, 2, \ldots, N$), for light issuing from the selected surface, after the substrate has moved;

forming the cross-correlation function $$C(K) = \sum_{k=1}^{L} s_1(k + i - 1)s_2(k + K - 1)$$

$$(K = 1, \ldots, N - L + 1)$$

of the first and second arrays of light strength signals, where L is a predetermined integer satisfying $1 \leq L < N$ and i is a selected integer satisfying $1 \leq i \leq N$;

approximating the correlation function value $C(x)$ ($x=0,1,2,\ldots, N-1$) by a polynomial $p(x)$ of selected degree $M \geq 2$ for $M+1$ consecutive values $C(x)$ in a neighborhood of the largest value of $C(x)$, and determining the value $x=X_0$, drawn from the continuous line that is defined by $0 \leq x \leq N$, for which the polynomial $p(x)$ attains a maximum value; and determining that the substrate has moved an approximate distance $D=(MF)(X_0-i)d$ in the selected direction.

9. The method of claim 8, further comprising the step of treating motion of said substrate in said selected direction as absent unless said substrate has moved at least a distance $\mu d$ in said selected direction, where $\mu$ is a selected positive threshold constant.

10. The method of claim 8, further comprising the steps of:

forming a peak correlation value $C_p$ defined by $$C_p = \sum_{k=1}^{L} s_1(k + i - 1)^2$$

from said first array of light strengths;

comparing the peak value $C_p$ with the maximum polynomial value $p(X_0)$ found from said polynomial values $p(x)$; and indicating that an error may be present if $p(X_0)/C_p < f$, where f is a predetermined positive number satisfying $0 < f < 1$.

11. The method of claim 8, further comprising the step of choosing said number M to be equal to 2.

12. The method of claim 8, wherein said step of illuminating said substrate comprises illuminating said substrate with a light beam that is focused by a telecentric optical system.

13. The method of claim 8, wherein said step of illuminating said substrate with said light comprises causing said light to be reflected from said substrate selected surface.

14. The method of claim 8, wherein said step of illuminating said substrate with said light comprises causing said light to be transmitted through said substrate.

15. A method for determining the distance of advance in a selected direction of a sheet of paper or other substrate, the method comprising the steps of:

illuminating a selected surface of the substrate with light of at least a predetermined light strength signal at a predetermined angle;

providing a linear array of N light sensors, uniformly spaced apart by a distance d along the linear array, that each receive and sense the signal strength of light issuing from the selected surface at a predetermined optical magnification factor MF and provide a first array of light strength signals $s_1(k)$ ($i=1,2,\ldots, N$), where N is a selected integer $>2$;

allowing the substrate to move in the selected direction;

allowing the array of sensors to each receive and sense a second array of light strength signals $s_2(k)$ ($k=1,2,\ldots, N$), for light issuing from the selected surface, after the substrate has moved;

forming the cross-correlation function $$C(K) = \sum_{k=1}^{L} w_k s_1(k + i - 1)$$

$$s_2(k + K - 1)(K = 1, \ldots, N - L + 1)$$

of the first and second arrays of light strength signals, where L is a predetermined integer satisfying $1 \leq L < N$, i is a selected integer satisfying $1 \leq i \leq N$, and the weights $w_k$ represent a Doubly Monotone weight function, and determining the value $K_0$ of the integer K that produces the largest value of the cross-correlation function value $C(K)$; and determining that the substrate has moved an approximate distance $D=(MF)(K_0-i)d$ in the selected direction.

16. The method of claim 15, further comprising the step of choosing said weights $w_k$ to represent a rectangular function.

17. The method of claim 15, further comprising the step of choosing said weights $w_k$ to represent a trapezoidal function.

18. The method of claim 15, further comprising the step of choosing said weights $w_k$ to represent a triangular function.

19. The method of claim 15, wherein said step of illuminating said substrate with light comprises causing said light to be reflected from said substrate selected surface.

20. The method of claim 15, wherein said step of illuminating said substrate with light comprises causing said light to be transmitted through said substrate.

21. The method of claim 15, wherein said step of illuminating said substrate comprises illuminating said substrate with a light beam that is focused by a telecentric optical system.

22. A method for determining the distance of advance in a selected direction in a two-dimensional plane of a sheet of paper or other substrate, the method comprising the steps of:

illuminating a selected surface of the substrate with light of at least a predetermined light strength signal at a predetermined angle;

providing a two-dimensional array of $N_1 \times N_2$ light sensors, uniformly spaced apart by distances d1 and d2 in two respective independent directions within the array, where each light sensor receives and senses the signal strength of light issuing from the selected surface at a predetermined optical magnification factor MF and provides a first array of light strength signals $s_1(k_1,k_2)$ ($k_1 = 1, 2, \ldots, N_1$; $k_2 = 1, 2, \ldots, N_2$), where $N_1$ and $N_2$ are selected integers $>2$;

allowing the substrate to move in the selected direction;

allowing the array of sensors to each receive and sense a second array of light strength signals $s_2(k_1,k_2)$ ($k_1 = 1, 2, \ldots, N_1$; $k_2 = 1, 2, \ldots, N_2$), for light issuing from from the selected surface, after the substrate has moved;

forming the cross-correlation function $C_2(f1K_1 \cos \Omega + f1K_2 \sin \Omega + K_3, f2K_1 \sin \Omega + f2K_2 \cos \Omega + K_4)$, where $$C_2(K', K'') = \sum_{k_1=1}^{L_1} \sum_{k_2=1}^{L_2} s_1(k_1 + i_1 - 1, k_2 + i_2 - 1)$$
$$s_2(k_1 + K' - 1, k_2 + K'' - 1)$$
$$(K' = 1, \ldots, N_1 - L_1 + 1; K'' = , \ldots, N_2 - L_2 + 1),$$

of the first and second arrays of light strength signals, where $L_1$ and $L_2$ are predetermined integers satisfying $1 \leq L_1 < N_1$ and $1 \leq L_2 < N_2$ and $i_1$ and $i_2$ are selected integers satisfying $1 \leq i_1 \leq N_1$ and $1 \leq i_2 \leq N_2$, and determining the values of the integers $K_1$, $K_2$, $K_3$ and $K_4$, the values of the scale factors f1 and f2 ($0 < f1, f2 \leq 1$) and the value of the rotation angle $\Omega$ ($0 \leq \Omega < 2\pi$) that collectively product the larges value of the cross-correlation function value $C_2(f1K_1 \cos \Omega + f1K_2 \sin \Omega + K_3, -f2K_1 \sin \Omega + f2K_2 \cos \Omega + K_4)$; and determining that the substrate has moved by a two-dimensional vector in the plane corresponding to the choice of the parameters $K_1$, $K_2$, $K_3$, $K_4$, f1, f2 and $\Omega$ that maximize the cross-correlation function value $C_2(f1K_1 \cos \Omega + f1K_2 \sin \Omega + K_3, -f2K_1 \sin \Omega + f2K_2 \cos \Omega + K_4)$.

23. The method of claim 22, wherein said step of illuminating said substrate with light comprises causing said light to be reflected from said substrate selected surface.

24. The method of claim 22, wherein said step of illuminating said substrate with light comprises causing said light to be transmitted through said substrate.

25. The method of claim 22, wherein said step of illuminating said substrate comprises illuminating said substrate with a light beam that is focused by a telecentric optical system.

26. Apparatus for determining the distance of advance in a selected direction of a sheet of paper or other substrate, the apparatus comprising:

a light source and telecentric light focusing system for illuminating a selected surface of the substrate with light having a predetermined light strength and having a predetermined incidence angle relative to a selected light-receiving surface of the substrate;

N light sensors, positioned in a linear array and uniformly spaced apart by a distance d along the linear array, that each receive and sense the signal strength of light reflected from the selected surface at a predetermined optical magnification factor MF and provide a first array of light strength signals $s_1(k)$ ($k = 1, 2, \ldots, N$) before the substrate has been moved, and the array of light sensors also receives and senses a second array of light strength signals $s_2(k)$ ($k = 1, \ldots, N$), for light issuing from the selected surface with the optical magnification factor MF, after the substrate has been moved, where N is a selected integer $>2$; and computation means for receiving the first and second arrays of light strength signals $s_1(k)$ and $s_2(k)$, for forming a cross correlation function $$C(k) = \sum_{k=1}^{L} s_1(k + i - 1)$$
$$s_2(k + K - 1)(K = 1, \ldots, N - L + 1),$$

where L is a predetermined integer satisfying $1 \leq L < N$ and i is a selected integer satisfying $1 \leq i \leq N$, for determining the value of a positive integer $K = K_0$ that produces the largest value of the cross-correlation function C(K), and for determining and indicating that the substrate has moved an approximate distance $D = (MF)(K_0 - i)d$ in the selected direction.

27. The apparatus of claim 26, wherein said light used to illuminate said substrate is caused to be reflected from said selected surface of said substrate.

28. The apparatus of claim 26, wherein said light used to illuminate said substrate is caused to be transmitted through said substrate.

* * * * *